United States Patent [19]

Mansbridge et al.

[11] Patent Number: 5,143,276
[45] Date of Patent: Sep. 1, 1992

[54] DOMED STRUCTURES AND A METHOD OF MAKING THEM BY SUPERPLASTIC FORMING AND DIFFUSION BONDING

[75] Inventors: Martin H. Mansbridge; David Stephen; John Norton, all of Bristol, United Kingdom

[73] Assignee: British Aerospace Plc, London, United Kingdom

[21] Appl. No.: 688,100

[22] Filed: Apr. 19, 1991

Related U.S. Application Data

[63] Continuation-in-part of Ser. No. 404,422, Sep. 8, 1989, abandoned.

[30] Foreign Application Priority Data

Sep. 9, 1988 [GB] United Kingdom ............... 8821222

[51] Int. Cl.$^5$ ................. B23K 20/18; B23K 28/02; B21D 47/00
[52] U.S. Cl. ................... 228/157; 228/193; 228/265; 428/593; 29/455.1; 220/469; 244/119; 52/80
[58] Field of Search ............. 228/157, 193, 265; 72/60; 428/593; 29/455.1, 889, 889.2, 889.72; 220/469; 244/117 R, 119; 52/80

[56] References Cited

U.S. PATENT DOCUMENTS

| 3,024,525 | 3/1962 | Wisberger | 29/421 |
|---|---|---|---|
| 4,045,986 | 9/1977 | Laycock et al. | |
| 4,217,397 | 8/1980 | Hayase et al. | 428/594 |
| 4,304,821 | 12/1981 | Havase et al. | 428/593 |
| 4,351,470 | 9/1982 | Swadling et al. | 228/157 |
| 4,420,958 | 12/1983 | Schulz et al. | 72/21 |
| 4,422,569 | 12/1983 | Payne et al. | 228/173 |
| 4,526,312 | 7/1985 | Goss et al. | 228/157 |
| 4,632,296 | 12/1986 | Mansbridge et al. | 228/157 |
| 4,833,768 | 5/1989 | Ecklund et al. | 29/421.1 |

FOREIGN PATENT DOCUMENTS

| 622191 | 1/1976 | Switzerland . |
| 1377421 | 1/1972 | United Kingdom . |
| 1429054 | 7/1973 | United Kingdom . |
| 1495655 | 10/1975 | United Kingdom . |

Primary Examiner—Kenneth J. Ramsey
Attorney, Agent, or Firm—Kerkam, Stowell, Kondracki & Clarke

[57] ABSTRACT

The present invention provides a method of making a domed structure using superplastic forming and diffusion bonding techniques. The dome is of a deep and/or irregular shape that cannot be achieved by creep forming. The method includes the step of forming a stack of two or more sheets made of superplastic material and the sheets of the stack being joined together in face to face contact by metallic bonds such that no sheet in the stack is bonded to more than one of its neighbouring sheets; the metallic bonds preferably lie on lines extending radially from and/or circumferentially around the said peak. The resulting stack is heated to superplastic termperatures and a pressure differential is established across the stack to form it into a domed shape. The resulting dome is placed in a mould and heated; an inert gas is injected between the sheets to inflate the stack superplastically thereby forming a space between the sheets which is divided into cells by webs formed from two of the said sheets that have been superplastically formed by the inflation process.

15 Claims, 10 Drawing Sheets

FIG. 23a
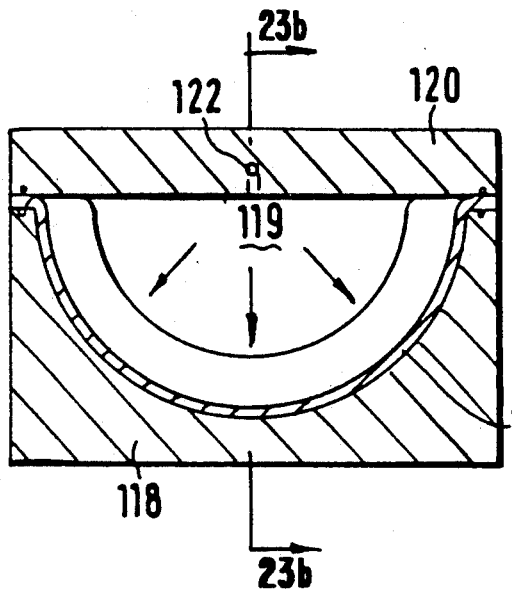
FIG. 23b
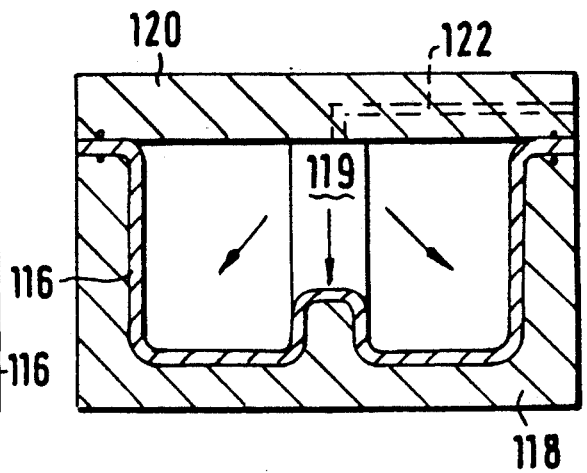
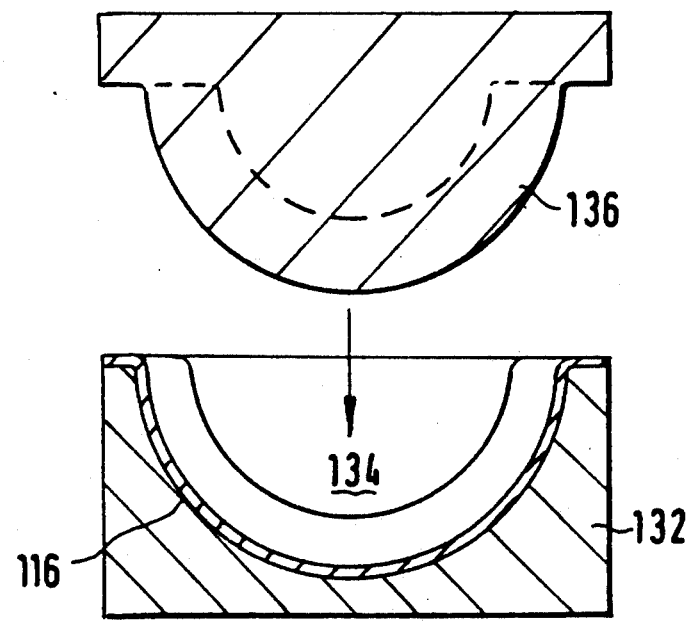
FIG. 24

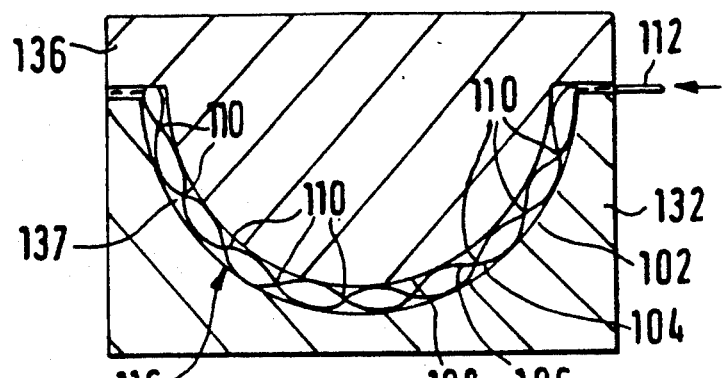
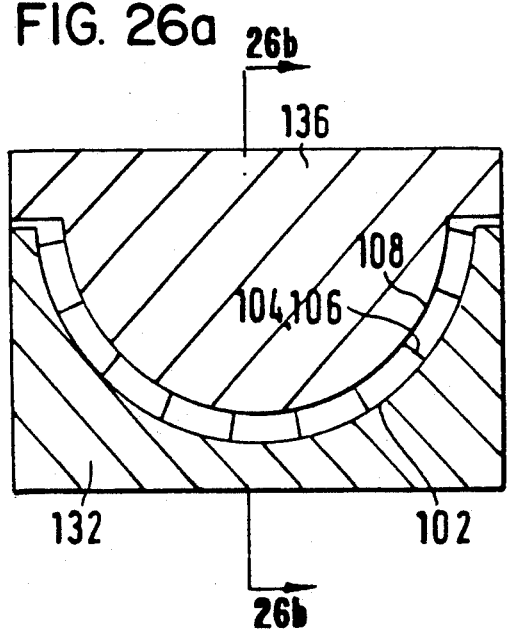
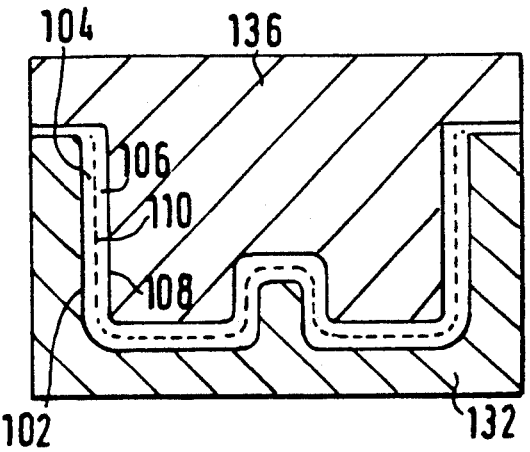
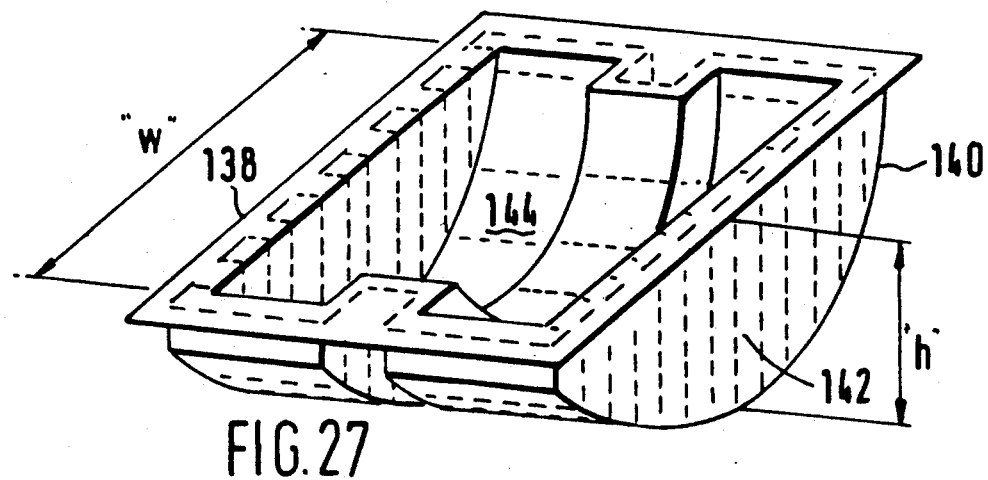

DOMED STRUCTURES AND A METHOD OF MAKING THEM BY SUPERPLASTIC FORMING AND DIFFUSION BONDING

This application is a continuation-in-part of pending application Ser. No. 404,422, filed Sep. 8, 1989, now abandoned.

FIELD OF THE INVENTION

This invention relates to domed structures having walls of a cellular construction. As used herein, the term 'domed structure' and like expressions means a structure having two (or more) opposed external surfaces one being generally convex, the other being generally concave. The domed structure is hollow, that is to say it contains an open-ended cavity that is bounded by he external surface of the concave wall. Both the concave wall and the convex wall are curbed in more than one direction, that is to say the present invention is not intended to encompass a folded structure simply having a straight ridge on the concave surface and a straight furrow on the opposed concave surface. The domed structures may have a peak on its convex surface, the structure sloping away from the peak in all directions. The peak need not be a point but rather can be a general area at the top of the dome and can include an indent The term 'domed structure' also includes structures in which the dome forms only a part of a larger structure, the remainder having any desired shape.

BACKGROUND ART

Hitherto, it has been practice to fabricate domed structures having cellular walls, such as pressure bulkheads in aircraft, from suitably-shaped individual component parts that are joined together, e.g. by rivets. However, such a practice is complicated because each part must be individually shaped and the shaped components must be exactly positioned before riveting; furthermore, the presence of the rivets adds to the weight of the structure with is disadvantageous, particularly in aerospace applications.

Prior art has suggested methods of making shallow domed structures of regular shape (see U.S. Pat. Nos. 4,833,768 and 3,024,525 discussed below); however, no teaching is contained in the prior art for making deep-domed structures especially those of an irregular shape.

U.S. Pat. No. 4,833,768 describes a method of forming a cellular domed structure from two or more sheets. In this process the sheets are joined together to form a stack and placed between two moulds, one of convex form and the other of concave form; the moulds are then slowly brought together so that the convex mould presses against the stack of sheets to form the stack into a domed shape; the pressing of the stack of sheets continues until the mould is closed (this technique is known as "creep-formation"); then gas is injected into the space between the sheets to inflate the stack of sheets and superplastically form them into a shallow cellular domed structure. The method described cannot be used to form a deep-domed structure or a structure having a shape that is not a smooth dome because creep forming cannot stretch the sheet sufficiently to form such structures without necking or fracturing the metal, that is to say creep-forming can achieve an elongation only of the order of 20%, which does not allow formation of a deep-domed structure or a structure having a shape that is significantly different from a smooth dome.

U.S. Pat. No. 3,024,525 describes a method of making a multi-walled shallow-domed structure of circular-symmetric shape, e.g. for use as parabolic radar reflector dishes. The structure is made by joining two sheets together, slowly pulling the sheets over a domed die to creep form the sheets into a domed shape that is complementary to the shape of the domed die; gas is then injected into the space between the sheets to force the outer sheet away from the inner sheet. The outer sheet provides a strengthening backing sheet to the inner sheet. Such a method is not suitable for forming deep-domed structures nor domed structures of irregular shape because, as discussed above, creep forming can only achieve limited stretching of the sheets concerned.

It is well known that certain metals have superplastic characteristics, i.e. a composition and micro-structure such that when heated to within an appropriate temperature range and when deformed at a strain rate within an appropriate range they exhibit the flow characteristics of a viscous fluid. With such metals, large deformations (e.g. in excess of 100-200% and typically of order of 1000%) are possible without fracture. Diffusion bonding is also a well-known process by which a metallurgical bond is formed by the application of heat and pressure to metallic pieces held in close contact for a specific length of time. Bonding is thought to occur by the movement of atoms across adjacent faces of the pieces. The process allows metals to be joined without significantly changing their physical or metallurgical properties. The temperature ranges at which superplasticity and diffusion bonding occur may or may not be the same depending upon the material joined. It is also known to combine diffusion bonding and superplastic forming in a final shape by superplastic forming. It is known from U.D. Patent No. 1,378,421 to form an inflatable envelope by metallurgically bonding together peripheral regions of two substantially flat sheet member of metal having superplastic characteristics, heating the envelope to within the temperature range for superplasticity of the metallic alloy, and applying a differential pressure between the interior and the exterior of the envelope while it is within the said temperature range such that the envelope expands as a balloon. The end product is a spherical container suitable for use as a pressure vessel and not domed structure having walls of a cellular structure.

In U.K. Patent 1,429,054 a method of forming a stiffened panel is taught in which an interior sheet is placed between two face sheets and the inner faces of each of the face sheets are attached directly to the respectively adjacent faces of the interior sheet by metallurigically bonded regions. At least the interior sheet is of superplastic material. The sheets are welded around their assembled peripheries to form a sealed envelope which is fed internally with a pressurized inert gas such that when the interior sheet is superplastic the outer sheets are moved apart by a predetermined amount to affect corrugation of the interior sheet thus effectively achieving a cellular structure of 'zig-zag' construct. The final panel is not domed.

In yet a further arrangement, as exemplified by U.S. Pat. Nos. 4,217,397 and 4,351,470, twin interior sheets forming a sealed envelope and being joined to each other by metallurigically bonded regions are supplied with inert gas under pressure, thereby causing the sheets to move away from each other within a limiting fixture, which may include face sheets, the envelope being expanded against the face sheets to form a series of cavities between the sheets, the said cavities being preferably of substantially rectangular form. The process is generally applied to form flat panels but the patent specification says that it is possible to use face sheets that are not flat. However, the forming of such non-flat sheets is complex.

U.S. Pat. No. 4,526,312 teaches a method of making metallic sandwich structure by superplastic forming and diffusion bonding using a three sheet stack but whereas in the previous examples of prior art the expanded assembly remains substantially flat, in this example the sandwich structure can be used to achieve single curvature configuration, that is to say the structure has a straight ridge along an external face. The flat stack is placed in a mould and simultaneously or sequentially formed to a desired curvature; it is then trimmed and the trimmed stack is placed in a further mould defining the boundaries of the required component form and then formed into the expanded sandwich structure. In the arrangement as taught the corrugations or 'zig-zag' stiffeners lie transversely to the radius of curvature parallel, i.e. the stiffeners lie parallel to the ridge.

Although the referenced prior art teaches a deep drawn pressure vessel and alternative arrangements of cellular or sandwich structures using superplastic forming and/or diffusion bonding techniques, there is, as far as we are aware, no known method of construction in the art for producing a deep domed cellular structure or a domed structure of irregular shape, for example a pressure bulkhead in an aircraft fuselage and in particular neither U.S. Pat. No. 4,833,768 now U.S. Pat. No. 3,024,525 discloses a process capable of making such a structure.

It is the object of the present invention to provide a method of making a deep-domed structure.

DISCLOSURE OF THE INVENTION

According to the present invention there is provided a method of manufacturing a domed metallic structure having walls of cellular construction comprising a convex surface and a concave surface opposed to the convex surface and defining a cavity, the greatest height of the cavity being at least one third of its greatest width, the method including the steps of:

providing at least two metal sheets having superplastic characteristics;

joining two of said sheets by face-to-face metallic bonds or welds and forming the sheets into a stack;

sealing the perimeter edges of said stack but including means for the admission of pressurised inert gas between said sheet thus forming an inflatable envelope assembly;

placing said stack in a fixture including means for sealingly clamping said stack within said fixture at or about its perimeter and means for the admission of a supply of pressurised inert gas to one external face of said stack;

heating said stack and said fixture to a temperature suitable for superplastic forming, applying gas pressure to one external face of said stack such that the stack is expanded superplastically to a pre-defined domed shape having a height that is at least one third its width;

placing said pre-formed stack in a mould tool having opposed concave and convex surfaces defining between them a space of domed form, the height of the convex surface being at least one third its width;

heating the stack to a temperature suitable for superplastic forming and diffusion bonding, supplying inert gas under pressure between said sheets, thereby expanding by superplastic forming the outermost sheets of said pre-formed stack to conform to the convex and concave mould surfaces to form the said concave and convex surfaces of the structure and further causing the said sheets joined by face-to-face metallic bonds to expand about said metallic bonds to form web extending between the convex and the concave surfaces of the structure thereby defining the said cellular construction, and further causing any sheets of the stack that are not already joined to other sheets of the stack by face-to-face metal bonds to be diffusion bonded to at least one other sheet of the stack.

The present invention is thus useful for forming deep-domed structure means that the structure has a non-uniform surface.

As used herein the term "irregular" when applies to a domed structure means that the structure has a non-uniform surface configuration including one or more irregularities of shape, e.g. one or more indentations or edges. Thus, an irregular structure when viewed in elevational cross-section does not have a smooth part-circular or part-elliptical shape, preferably the structure when viewed in plan cross-sectional is not circular.

The present invention also provides a domed structure.

BRIEF DESCRIPTION OF THE DRAWINGS

Alternative embodiments of the present invention will now be described, by way of example only, with reference to the following drawings in which:

FIGS. 19 to 26 show a scheme for producing a domed structure, in this case a panel forming an aircraft wheel arch;

FIG. 19 is an exploded view of a stack of four sheets used for forming the structure;

FIG. 20 is an exploded view of the stack of sheets in which the middle two sheets have been joined;

FIG. 21 is an exploded isometric drawing of a tool for forming the stack of sheets into a blank;

FIGS. 23a and 23b are two sectional views of the tool shown in FIGS. 22a and 22b but after the stack of sheet has been formed into the blank;

FIG. 24 is a sectional view of a second tool for inflating the blank into a domed panel, and FIG. 25 is the same sectional view as FIG. 24 but showing the blank partly inflated;

FIGS. 26a and 26b are two sectional views showing the tool of FIG. 25 but with the blank fully inflated to form the domed component, and FIG. 27 is an isometric view of the finished domed component.

DETAILED DESCRIPTION OF THE DRAWINGS

Figure 1:
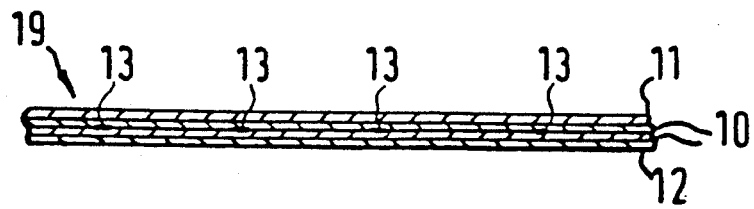
FIG. 1 illustrates, in cross-section, a portion of a four-sheet assembly prior to forming.
Figure 13:
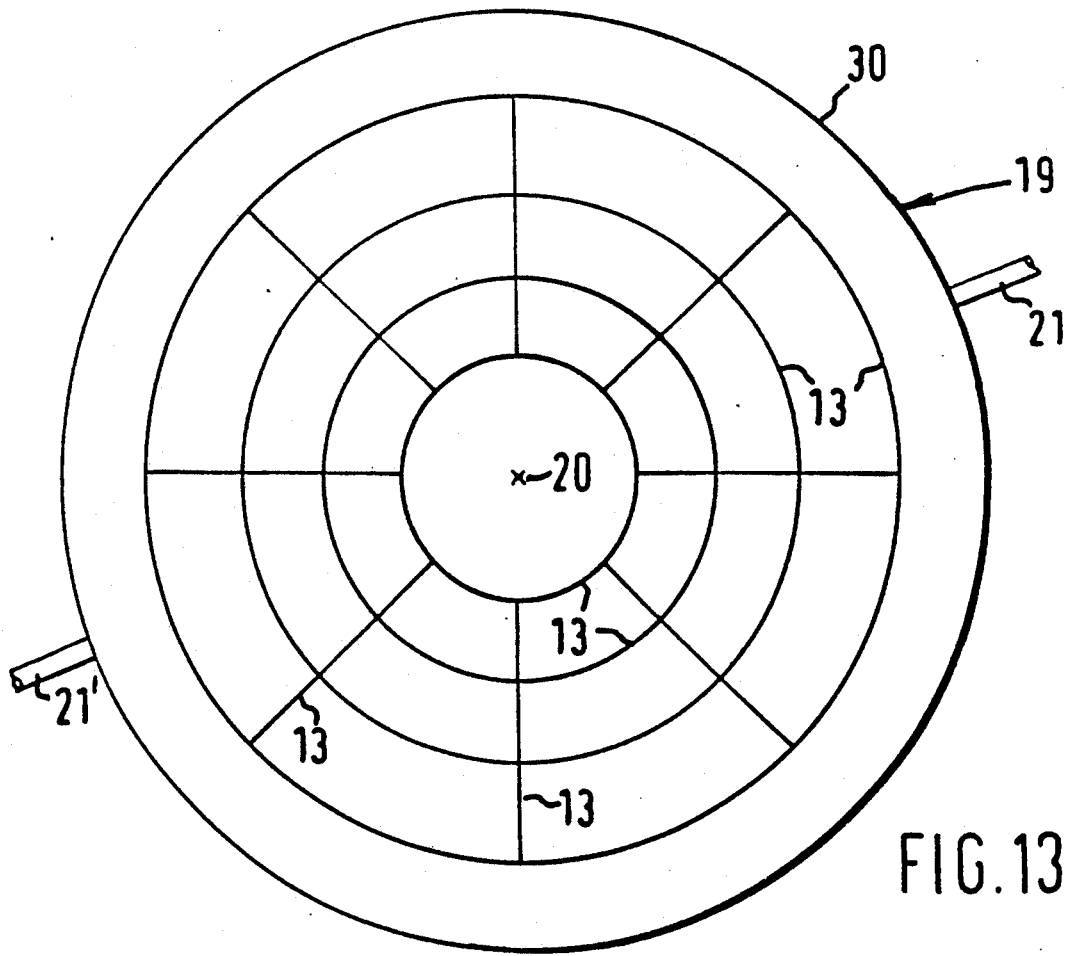
FIG. 13 illustrates diagrammatically in plan view a circular assembly of sheets prior to forming.

Referring to the drawings, three possible laminate lay up are first discussed with reference to FIGS. 1, 5, 9 and 13. FIG. 1 shows a four sheet lay up; two interior (or core) sheets 10 are placed between two outer (or face) sheets 11 and 12 to form a stack 19. The interior sheets 10 are metallurigically bonded together at 13 but are not bonded to outer sheets 11 and 12. The position of the bonds is shown in FIGS. 13 and, as can be seen, the bonds 13 are formed along lines running radially and circumferentially with respect to a point (or area) 20 which will form the peak of the desired domed structure. The bonds 13 need not be formed continuously all the way along the lines indicated and indeed, as stated below, preferably they are not continuous; suitable point bonds formed along the indicated lines will be satisfactory. The metallurgical bonds indicated may be resistance welds, electron beam welds or diffusion bonds and may be of line or spot form in accordance with requirements. The four sheets 10, 11 and 12 are circular in order to make a dome of circular plan and are made of superplastic material, that is to say material that when heated to a suitable temperature exhibits superplastic properties.

Figure 5:
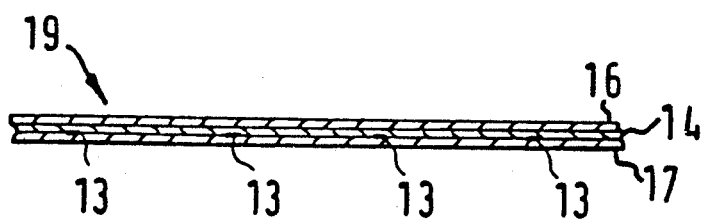
FIG. 5 illustrates, in cross-section, a portion of a three-sheet assembly prior to forming.

In FIG. 5, a three sheet arrangement is illustrated in which a superplastic interior sheet 14 is sandwiched between two superplastic face sheets 16 and 17 to form a stack 19. The interior sheet 14 is metallurigically bonded to the lower face sheet 17 as shown by bonds 13, the positions of which are the same as in the four sheet arrangement, i.e. as shown in FIGS. 13. Sheets 14 and 16 are not joined together.

Figure 9:
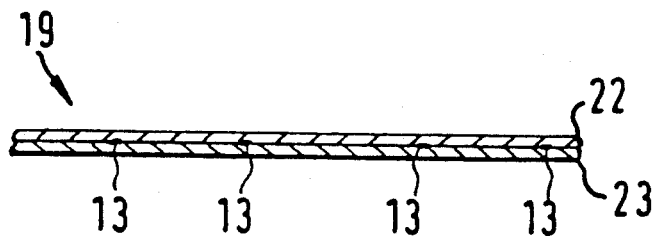
FIG. 9 illustrates, in cross-section, a portion of a two-sheet assembly prior to forming.

In FIG. 9, a two sheet arrangement is illustrated in which superplastic sheets 22 and 23 are joined together by bonds 13 (the positions of which are as shown in FIG. 13) to form a stack 19.

Three examples of methods of producing a cellular domed structure in accordance with the invention are illustrated in connection with FIGS. 2 to 4 (illustrating the structure achieved with the four sheet lay up of FIG. 1), FIGS. 6 to 8 (illustrating the structure achieved with the three sheet lay upon of FIG. 5) and FIGS. 10 to 12 (illustrating the structure achieved with the two sheet lay up of FIG. 9). The optimum cellular structure that is chosen in practice will be determined by structural requirements.

The peripheral edge 30 of the blank assembly is TIG (tungsten inert gas) welded to form a sealed envelope (see FIG. 13) and further incorporated into the edge are twin as inlet ports 21 and 21' (see FIG. 13) for the supply of inert gas under pressure to the interspaces between the respective sheets. With the four sheet arrangement (FIGS. 1 to 4), insert gas may be fed to the interface between the two face sheets 10 and, independently, to the following two interfaces: the interface between face sheet 11 and its adjacent core sheet 10 and the interface between the sheet 12 and its adjacent core sheet 10. With the three sheet arrangement (FIGS. 5 to 8), inert gas may be fed to the interface between core sheet 14 and face sheet 17 and, independently, to the interface between core sheet 14 and face sheet 16. In the two sheet arrangement (FIGS. 9 to 12), inert gas can be fed to the interface between sheets 22 and 23.

Figure 2:
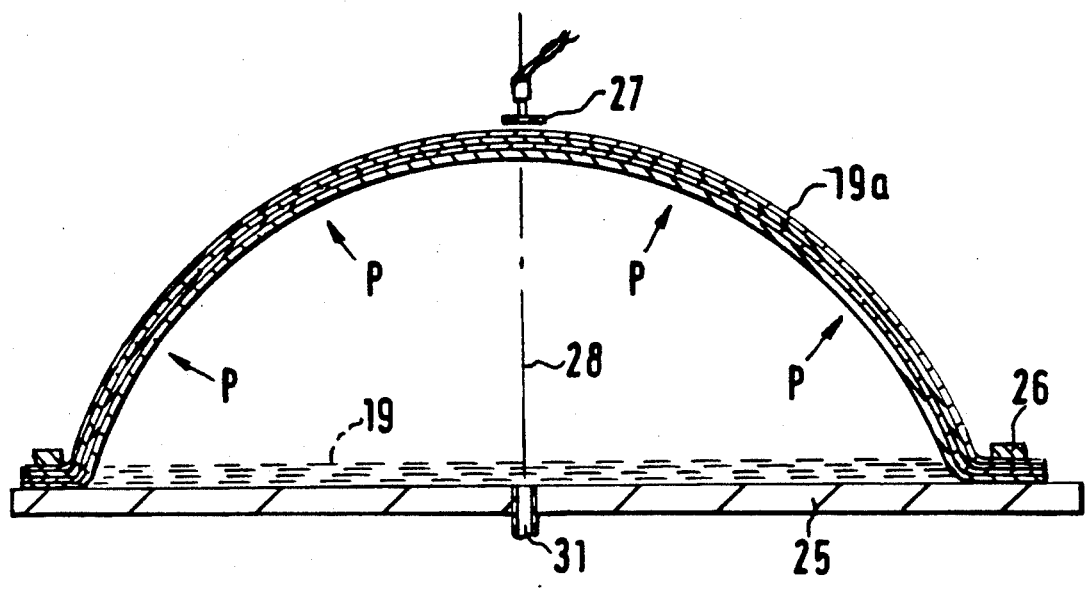
FIG. 2 illustrates, cross-sectionally, the four sheet assembly of FIG. 1 in free blown domed configuration.
Figure 3:
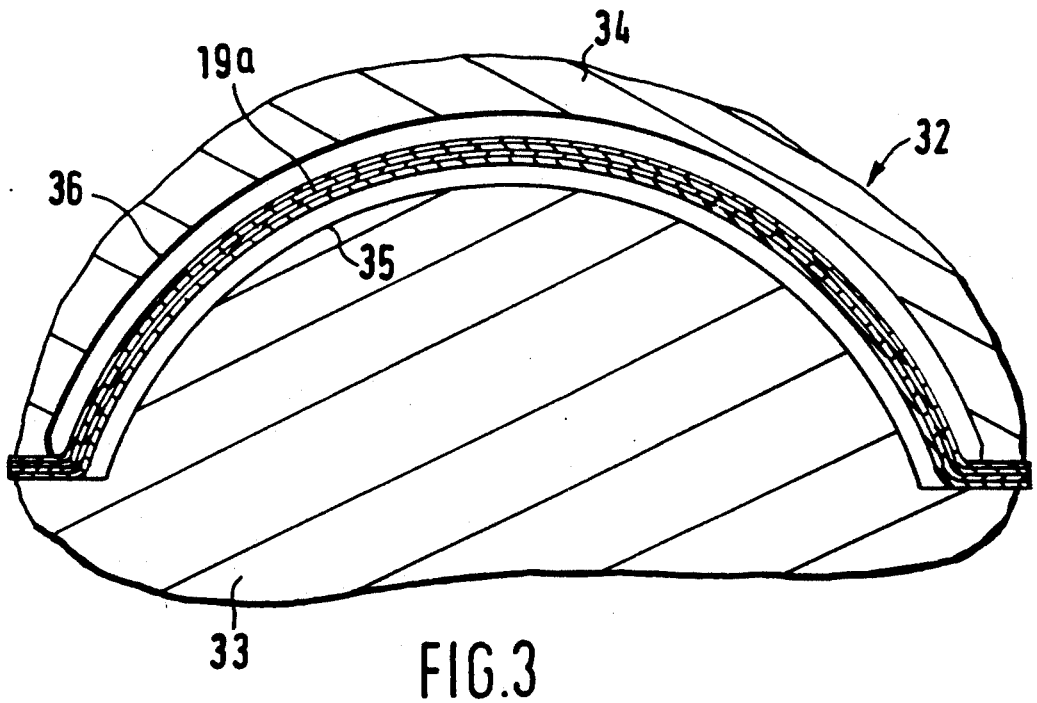
FIG. 3 illustrates, cross-sectionally, the free blown configuration of FIG. 2 mounted within a forming tool.
Figure 6:
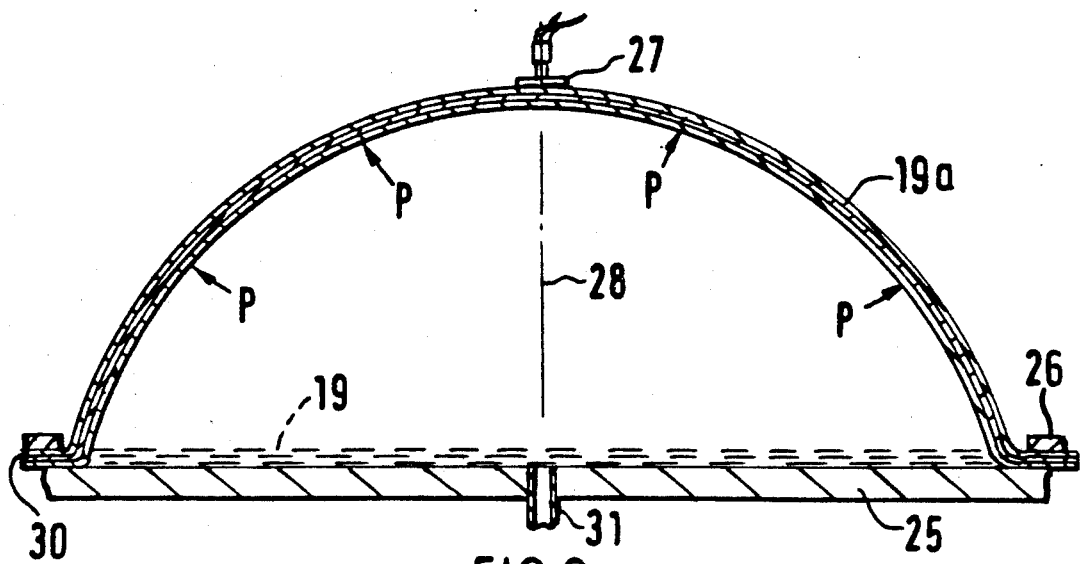
FIG. 6 illustrates, cross-sectionally, the three sheet assembly of FIG. 5 in a free blown domed configuration.
Figure 7:
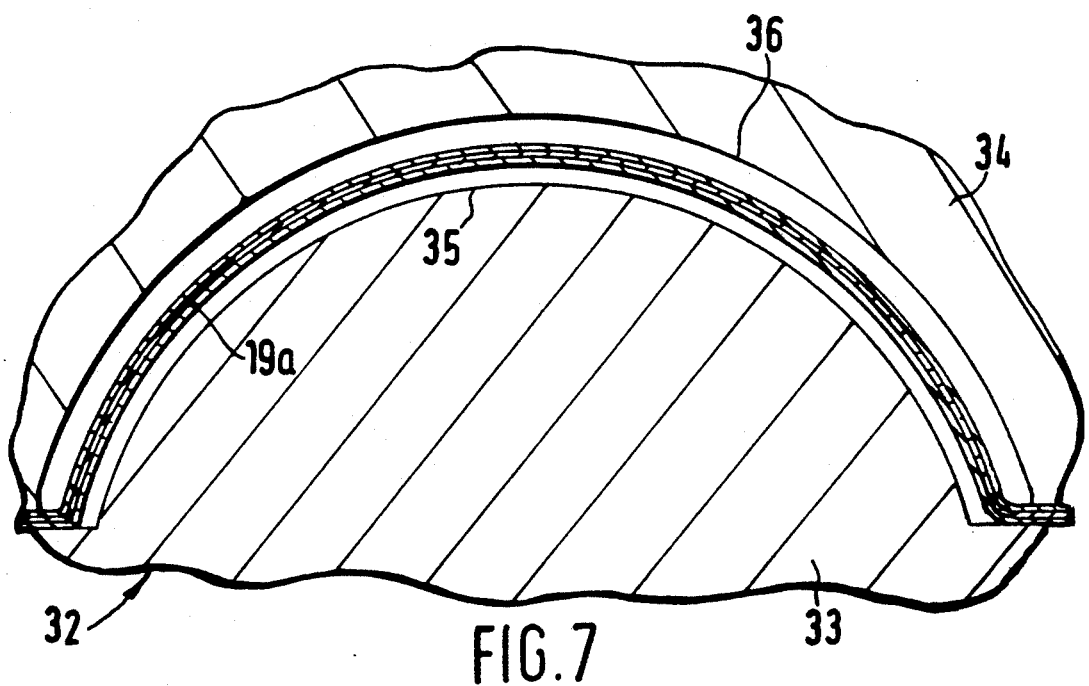
FIG. 7 illustrates, cross-sectionally, the free blown configuration of FIG. 6 mounted within a forming tool.
Figure 10:
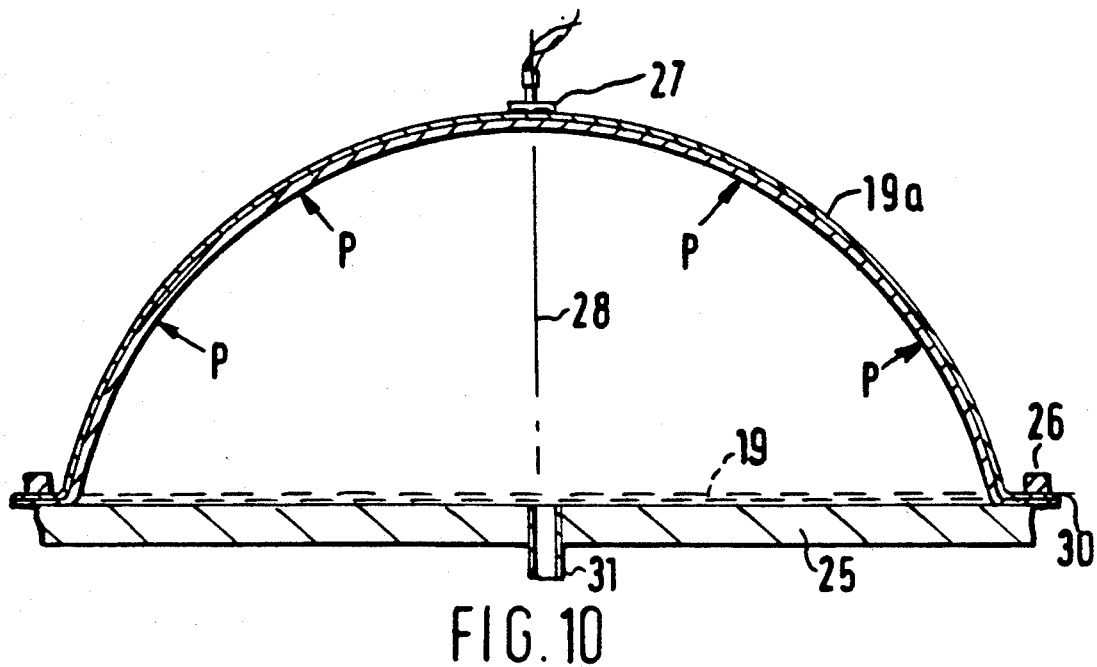
FIG. 10 illustrates, cross-sectionally, the three sheet assembly of FIG. 11 in a free blown domed configuration.
Figure 11:
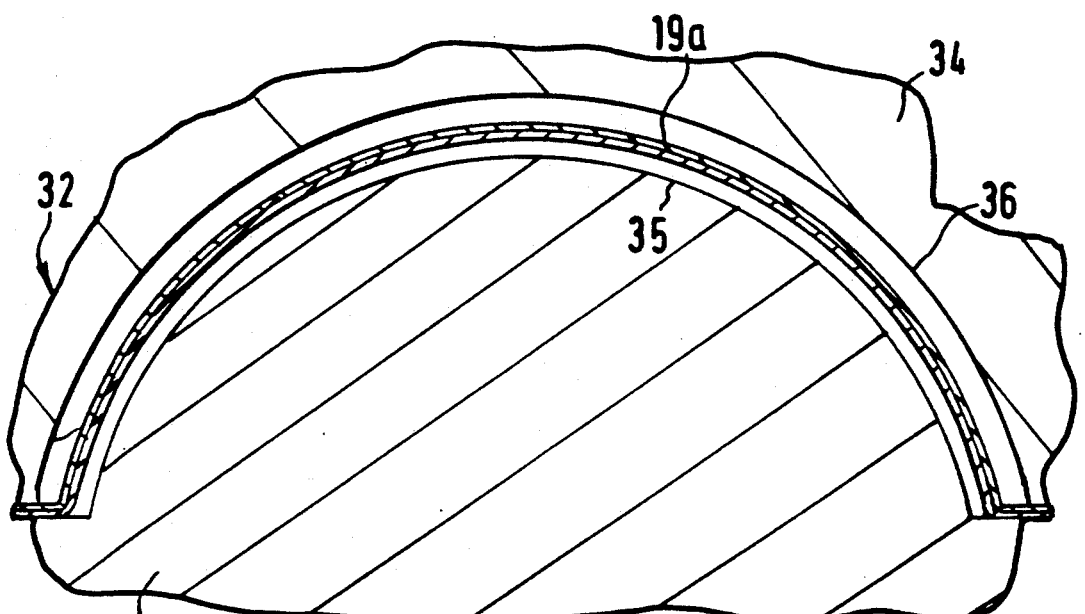
FIG. 11 illustrates, cross-sectionally, the free blown configuration of FIG. 10 mounted within a forming tool.

Referring initially to FIGS. 2, 6 and 10, the circular stack 19 (shown in ghost lines) composed of two, three or four sheets is placed in a sealed platen fixture 25 to which it is secured by means of a peripheral clamp 26. A cut out switch 27 is located above the platen coincident with the center line 28 and at a height corresponding to the desired dome height. The circular blank assembly 19 is heated to within the temperature range at which the material exhibits superplastic characteristics; pressurized inert gas is injected via the inlet port 31 which inflates the assembly until it attains the desired dome size 19a. In the illustrated embodiments, the process is free blown and the pressure will be cut off as the inflated envelope comes into contact with a cut out switch 27. Alternatively, the dome may be achieved by blowing into a female mould or template.

During the above-described formation of the domed blank 19a, gas is injected through the gas inlet ports 21 and 21' (not shown in FIGS. 2, 6 and 10) at a pressure that is just sufficient to initiate a slight expansion of the envelope (i.e. the pressure is insufficient to cause complete superplastic forming); this gas pressure maintains a small separation between the sheets during formation of the dome and so serves to deter diffusion bonding between abutting faces of the sheets. Diffusion bonding between sheets that are joined by bonds 13 can also be prevented by the application of a known stopping-off composition to the interface between these sheets but such a remedy is not available to prevent diffusion bonding in other interfaces in the stack 19 because such measures would also prevent diffusion bonding at a later stage of the process when it is necessary to bring about diffusion bonding at these other interfaces (see below) in order to form a stiff, unified domed structure. Deleterious diffusion bonding may be avoided in these cases by forming the dome at a temperature lower than that at which diffusion bonding will occur.

Once the stack 19 has been formed into the initial dome blank 19a, it is transferred to a forming mould tool 32 (see FIGS. 3, 7 and 11) which comprises a lower male tool 33 and an upper female tool 334, the male tool having a convex domed surface 35 and the female tool a concave surface 36 of inverted form configured such that when they are assembled around the domed blank 19a they form a parallel sided cavity having a depth corresponding to the required depth of the cellular structure.

Figure 4A:
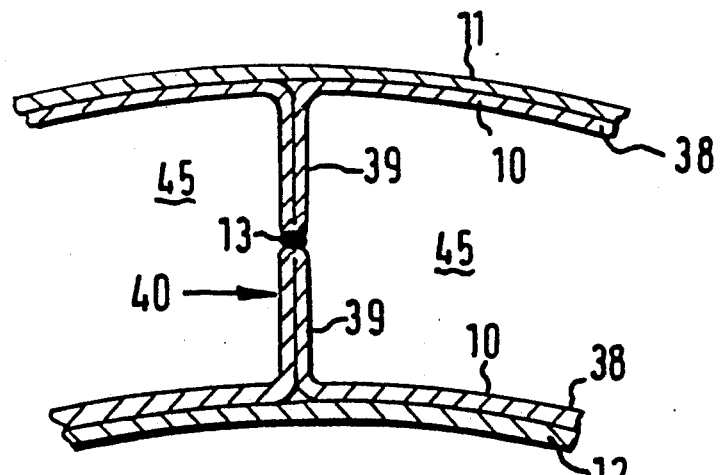
FIG. 4a illustrates a detail of FIG. 4.

In operation, the domed blank 19a is peripherally clamped within the mould tool assembly 32 and the whole is heated to within a temperature range at which the component sheets exhibit superplastic characteristics. An inert gas, e.g. argon, is admitted under pressure into the sealed envelope. In the case of the four sheet arrangement of FIGS. 1 to 4, gas is admitted to the interface between the face sheet 11 and the adjacent core sheet 10 and to the interface between the face sheet 12 and the core sheets 10 via tube 21 which inflates these face sheets superplastically in the manner of a balloon. The expansion of the outer face sheets 11 and 12 continues until they are brought into contact with (and conform to the shape of) the mould surfaces 35 and 36. When the inflation of the outer face sheets 11 and 12 is complete, further gas is supplied through tube 21' to the interface between the two core sheets 10. As stated above, the bonds 13 are preferably not formed continuously all the way along the lines shown in FIG. 13, but rather are interrupted by unbonded gaps that allow the inert gas from inlet tubes 21 to pass through them to reach all areas of the blank 19. The inert gas causes the stack to be inflated superplastically until the portions 38 of the interior sheets 10 abut against the outer sheets 11, 12 and so conform to the shape of the inner surfaces of the these outer sheets. However, the areas of the sheets 10 adjacent to bonds 13, which because of the bonds 13 are unable to be forced against the outer sheets, form abutting folded-back side wall portions 39 and the side wall portions on the two sheets 10 together form webs 40 separating the interior of the dome into cells 45 (see FIG. 4a). As the respective component elements meet, diffusion bonding occurs producing an homogeneous cellular structures of deep domed construction. The structure is held at a temperature for a sufficient time for the abutting parts of the structure to be diffusion bonded together.

With the three sheet arrangement of FIGS. 5 to 9, a flow of pressurised inert gas is firstly admitted via tube 21 to the space between sheets 14 and 16 causing the sheet 16 to expand, until it conforms in shape to the female upper mould surface 36. Then further pressurised inert gas is admitted through tube 21' to the interface between the sheets 14 and 17 causing sheet 17 to be urged against the male mould surface 35 such that portions 38 of that sheet conform to the shape of that surface. Expansion of interior sheet 14 causes it to be urged against the inner surface of sheet 16 until the portions 38 of that sheet conform to the shape of the inner surface of sheet 16 (see FIG. 8). In the area of the bond 13, webs 40 are formed by bent back portions 39 of sheets 14 and 17, which portions are connected by the metallic bonds 13. Again, the structure is held at a temperature for a sufficient time for the abutting parts of the structure to be diffusion bonded together.

With the two sheet embodiment, the inert gas is fed into the interspace between the two sheets 22 and 23 and inflates the sheets about bonds 13 until the portions 38 of these sheets conform to the surfaces 35 and 36 of the mould. Such a structure will have webs 40 formed by bent-back portions 39 of the sheets 23 and 24.

Figure 4:
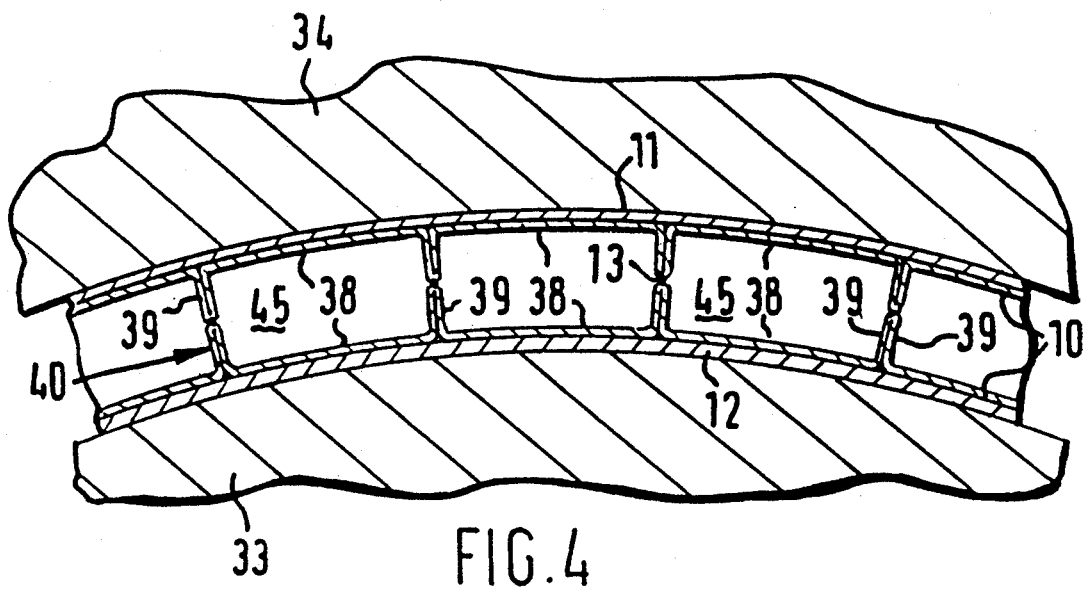
FIG. 4 illustrates, cross-sectionally, part of the free blown configuration of FIG. 3 after forming into an expanded cellular structure.
Figure 8:
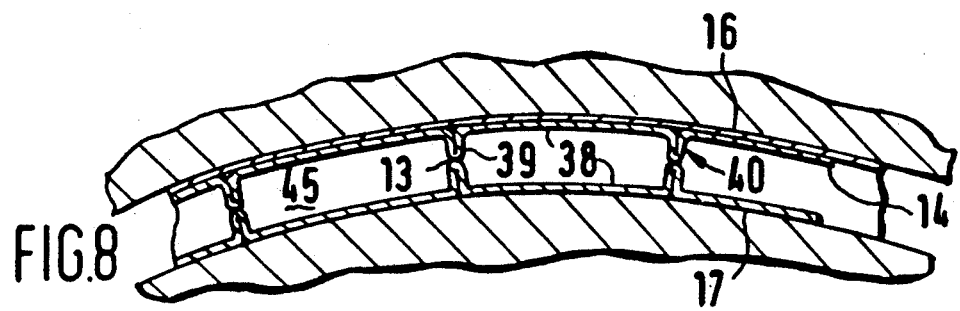
FIG. 8 illustrates, cross-sectionally, part of the free blown configuration of FIG. 7 after forming into an expanded cellular structure.
Figure 12:
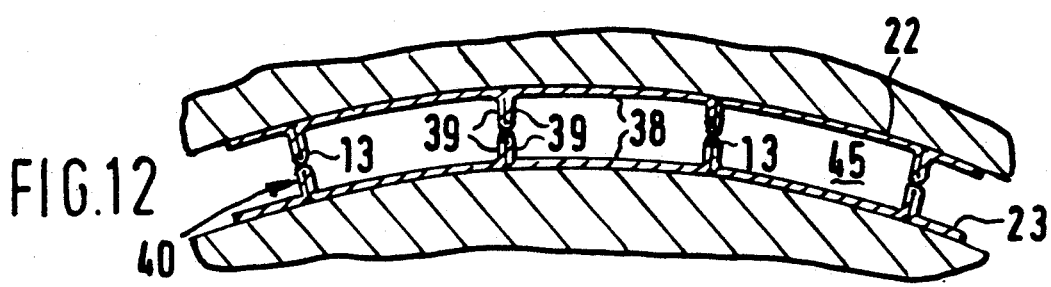
FIG. 12 illustrates, cross-sectionally, part of the free blown configuration of FIG. 11 after forming into an expanded cellular structure.
Figure 14:
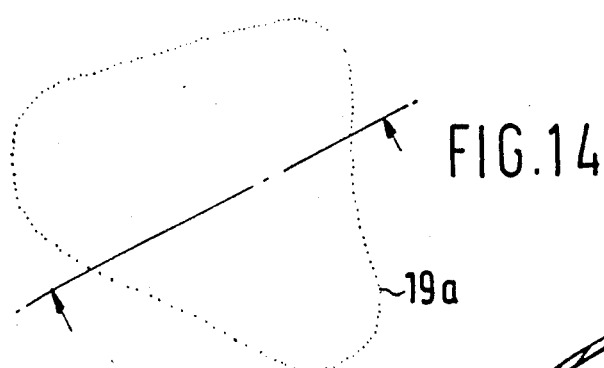
FIG. 14 illustrates, in plan view, a typical blank of irregular configuration.
Figure 15:
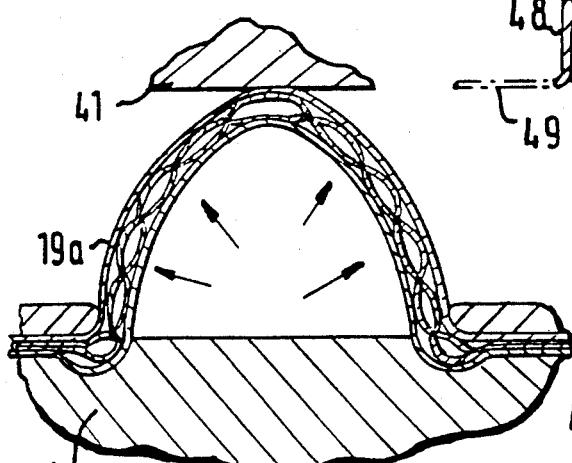
FIG. 15 illustrates, cross-sectionally, a four sheet assembly in free-blown partially inflated configuration.
Figure 17:
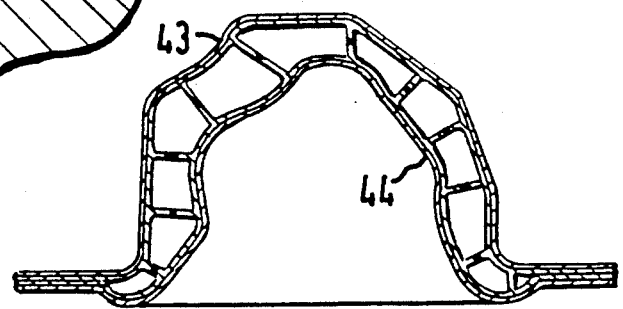
FIG. 17 illustrates, cross-sectionally, the fully inflated component of FIg. 15 after being formed into an expanded irregular structure of cellular form in the forming tool of FIG. 16.
Figure 16:
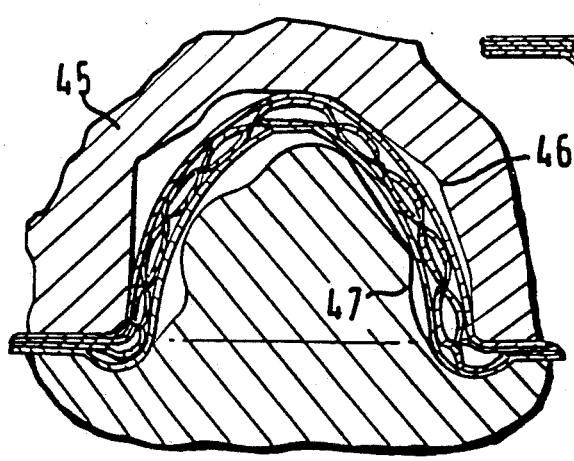
FIG. 16 illustrates, cross-sectionally, the partially inflated component of FIG. 15 mounted within a forming tool of irregular form.

The domed structures shown in FIGS. 4, 8 and 12 are deep-domed and are rotary-symmetric; however, it is not necessary for them to be rotary symmetric. As illustrated in FIGS. 14 to 18 inclusive, the blank 19 may be of irregular plan form and the method of forming may be adopted to produce a component having an irregular outer profile 43 and a different inner irregular profile 44 as shown in FIGS. 16 and 17. Referring to FIG. 15, the blank may (as in the previously described embodiment) be free blown within the bounds of the clamping fixture 41a and the limiting block 41 (or cut-out switch) but the stack may simultaneously be partly expanded as shown. This partially expanded component is then clamped within a mould tool assembly 45 having appropriately shaped upper and lower mould surfaces 46 and 47 then gas is injected firstly into the interface between each face sheet and its adjacent core sheet and then to the interfaces between the core sheets to attain the structure of FIG. 13.

Particularly when the dome is of irregular shape, the dome may not have a precisely defined peak but rather it may have a general peak area in which case the bonds 13 (see FIG. 13) will extend generally around the peak area and/or extend radially therefrom. The peak thus need not be a point and it cold be a flat plateau or a depression at the top of the dome. Furthermore, the circumferentially extending metallic bonds need not be circular in shape but could be composed of a number of straight lines.

Figure 18:
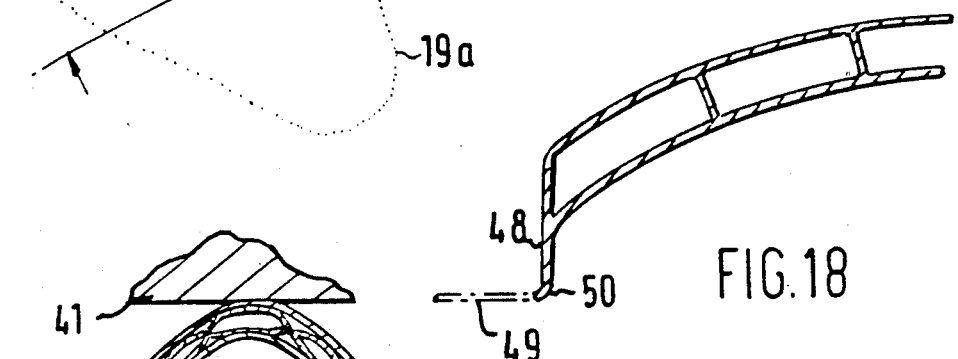
FIG. 18 illustrates a typical section through the edge of a fully formed domed structure.

One of the benefits of the method of the present invention is that it enables attachment faces angularly disposed to the forming plane to be formed as an integral part of the domed structure and which may, for instance, in the case of an aircraft pressure bulkhead be utilised for attachment to fuselage skin panels. One example is illustrated in FIG. 18 in which the domed structure is formed with an integral attachment face 48 as an extension f the peripheral clamping flange 49, the clamping flange 49 being removed along a trim line 50 on completion of production. Although in this instance the attachment face is shown at right-angles to the clamping face, it may be inclined if, for example, it has to conform to a tapering fuselage profile.

Figure 19:
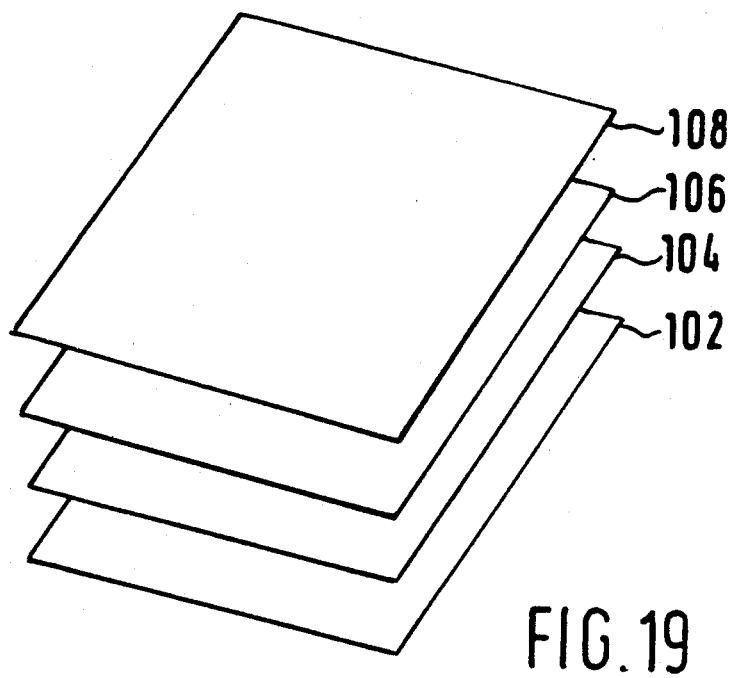
Figure 20:
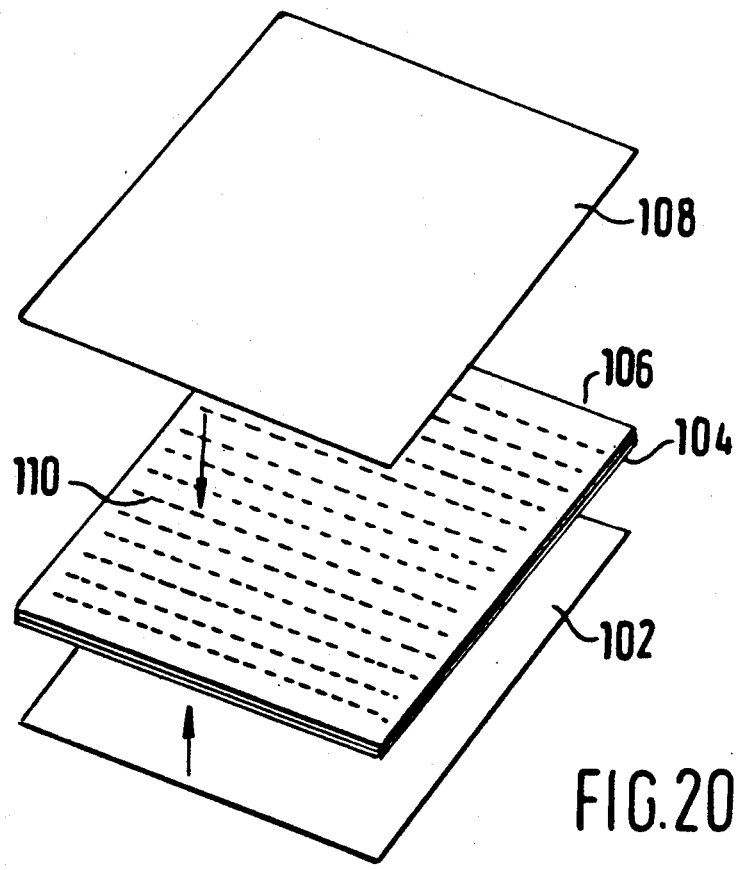

FIGS. 19 to 26 show the stages of forming a wheel arch panel for an aircraft which has traditionally been made by riveting formed sheets together. Referring initially to FIG. 19, there are shown four sheets made of a superplastic metal, e.g. titanium, two outer (or face) sheets 102 and 108 and two inner (or core) sheets 104 and 106. Core sheets 104, 106 are joined together by thin non-continuous welds 110 shown in FIG. 20; the welds are formed either by spot welding or by diffusion bonding. The sheets are then formed into a stack with the core sheets 104, 106 sandwiched between the face sheets 102, 108. Spouts 112, 114 are then fitted into the stack and the stack is T.I.G. welded around its periphery to form a blank 116 ()see FIG. 21). The T.I.G. weld holds the spouts 112, 114 in place; one of the spouts (112) provides communication to the space between the face sheets 104, 106 while the other spout (114) provided communication to the space between the core sheet 106 and face sheet 108.

Figure 21:
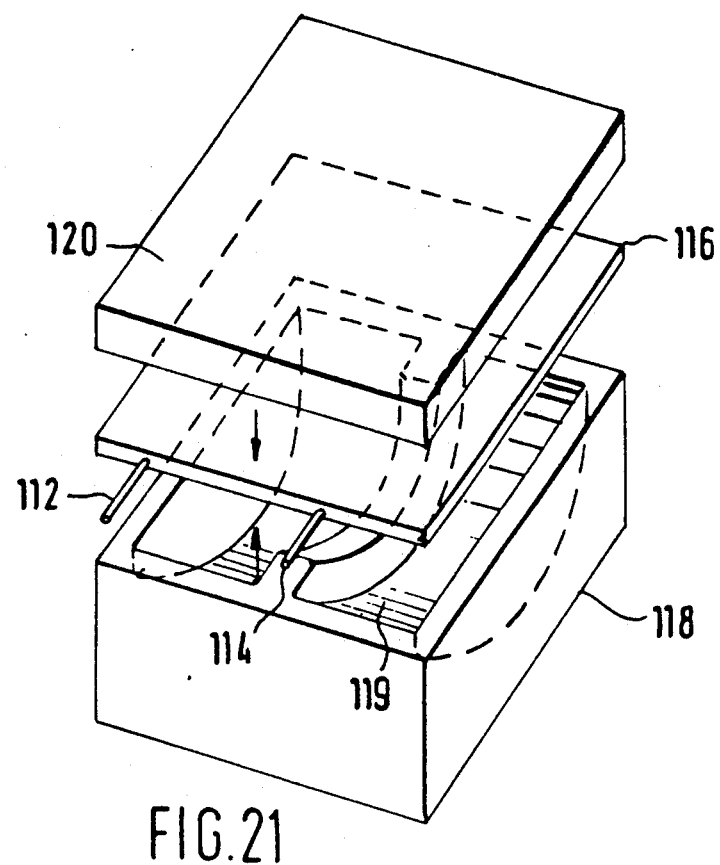

As shown in FIG. 21, the blank 116 is placed between a lower forming tool 118 having a cavity 119 and an upper forming tool 120 and the tool is closed (see FIG.

22). The upper 118, 120 is heated to a temperature at which the sheets can be superplastically formed and an inert gas is slowly injected through a duct 122 formed in the upper tool 120 into the space between the blank 116 and the upper tool, causing the blank to be superplastically formed (see FIG. 23), i.e. it is pushed into the cavity 119 of the lower tool 118 shown by the arrows in FIG. 23. The supply of gas is controlled so that the blank 116 does not neck and is continued for sufficient time to allow the blank 116 to be formed into the shape of the cavity 119 in the lower tool 118. The gas pressure within the tool 118, 120 is then released, the upper tool 120 is lifted and the formed blank is removed.

Figure 22A:
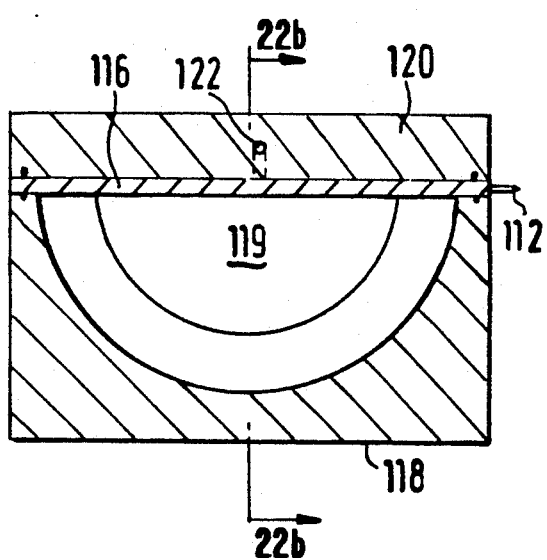
FIGS. 22a and 22b are two sectional views of the tool shown in FIG. 21.
Figure 22B:
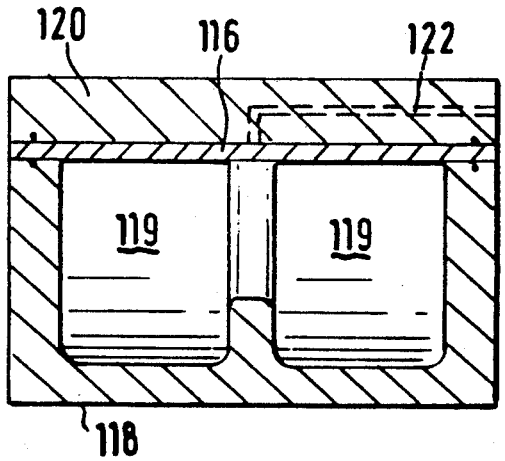

The formed blank 116 is then placed (see FIG. 24) into a cavity 134 in a further tool 132; the shape of the cavity 134 is exactly the same as the shape of cavity 119 shown in FIGS. 21 to 23 so that the blank 16 rests on the bottom of the cavity. An upper forming tool 136 is placed on the lower tool 132 and forms between it and the lower tool a sealed space 137 (see FIG. 25) that contains the blank 116.

The tools 132, 136 are heated to a temperature at which the blank can be superplastically formed and an inert gas is injected through spout 114 (not shown in FIG. 25) between core sheet 106 and face sheet 108 of the blank 116, thereby expanding sheet 108 until it contacts the upper tool 136 at the top of space 137. Inert gas is then injected through spout 112 between the core sheets 104 and 1076 to inflate the core sheets about welds 110 until they contact the face sheets 102 and 108; FIG. 25 shows the state of the core sheets 104, 106 when they have been partially inflated. Gas is able to pass from spout 112 throughout the space between core sheets 104 and 106 as a result of discontinuities in the welds 110.

FIG. 26 shows the state of the core sheet 104, 106 when they have ben fully inflated to fill the space between face sheets 102, 108. As weld is shown as a dotted line in FIG. 26b. The tool is maintained at a high temperature after the full expansion of the core sheets 104, 106 has been achieved and the gas pressure between core sheets 104, 106 is maintained in order to diffusion bond the core sheets 104, 10-6 to the face sheets. When that has been achieved, the tools are allowed to cool and the gas pressure is released. The upper and lower tools 132, 136 are then separated and the component is removed. The spouts 112, 114 are severed and the edges of the component are trimmed to form the finished domed component shown in FIG. 27; the component has an attachment flange 138, a convex surface 140 formed from sheet 102, a concave surface 142 formed from sheet 108 and stiffening webs (shown as broken lines in FIG. 27) of the form shown by the reference number 40 in FIG. 4a extending between, and diffusion bonded to, face sheets 102 and 108. The component has an internal cavity 144 bounded by the concave surface 142, the overall height of which (shown by arrow "h" in FIG. 27) is about 0.57 times the largest width of the cavity (shown by arrow "w" in FIG. 27), or the ratio "w" to "h" is about 1.8.

We claim:

1. A method of manufacturing a deep domed cellular metallic structure having walls of cellular construction comprising a convex surface and a concave surface opposed to the convex surface and defining a cavity, the greatest height of the cavity being at least one third of its greatest width, the method including the steps of:

providing at least two metal sheets having superplastic characteristics;

joining two of said sheets by face-to-face metallic bonds or welds and forming the sheets into a stack;

sealing the perimeter edges of said stack but including means for the admission of pressurised inert gas between said sheets thus forming an inflatable envelope assembly;

placing said stack in a fixture including means for sealingly clamping said stack within said fixture at or about its perimeter and means for the admission of a supply of pressurised inert gas to one external face of said stack;

heating said stack and said fixture to a temperature suitable for superplastic forming, applying gas pressure to one external face of said stack such that the stack is expanded superplastically to a predefined domed shape having a height that is at least one third its width;

placing said pre-formed stack in a mould tool having opposed concave and convex surfaces defining between them a space of domed form, the height of the convex surface being at least one third its width;

heating the stack to a temperature suitable for superplastic forming and diffusion bonding, supplying inert gas under pressure between said sheets, thereby expanding by superplastic forming the outermost sheets of said pre-formed stack to conform to the convex and concave mould surfaces to form the said concave and convex surfaces of the structure and further causing the said sheets joining by face-to-face metallic bonds to expand about said metallic bonds to form webs extending between the convex and the concave surfaces of the structure thereby defining the said cellular construction, and further causing any sheets of the stack that are not already joined to the other sheets of the stack by face-to-face metal bonds to be diffusion bonded to at least one other sheet of the stack.

2. A method as claimed in claim 1, wherein two metal sheets are provided and wherein the two sheets are joined in face-to-face contact by the said metallic bonds.

3. A method as claimed in claim 1, wherein three metal sheets are provided formed into a stack having two outer sheets and one internal sheet sandwiched between the outer sheets and wherein the internal sheet is joined to only one of the outer sheets by the said metallic bonds.

4. A method as claimed in claim 1, wherein four metal sheets are provided which are formed into a stack having two outer sheets and two internal sheets sandwiched between the outer sheets and wherein the internal sheets are joined together by the said metallic bonds.

5. A method as claimed in claim 1, wherein the metallic bonds lie on lines extending radially from and/or circumferentially around a point or a central area, the said point or area forming a peak in the said domed structure.

6. A method as claimed in claim 5, wherein the said circumferentially-extending metallic bonds or welds are circles that are concentrically spaced about a point and wherein the radially extending metallic bonds or welds extend radially away from that point.

7. A method as claimed in claim 1, which includes injecting inert gas between the sheets during the said step in which gas pressure is applied to one external face of said stack.

8. A method as claimed in claim 1, wherein the height of the cavity is at least one half its width.

9. A method as claimed in claim 1, wherein the domed structure has a non-uniform surface configuration including at least one irregularity of shape.

10. A method as claimed in claim 9, wherein at least one plan cross-section of the domed structure has a non-circular shape.

11. A method as claimed in claim 9, wherein the elevational cross-section of the domed structure is irregular in shape and is neither part-circular nor part-elliptical.

12. A method as claimed in claim 11, wherein the said cross-section includes at least one point of inflection.

13. A method as claimed in claim 1, wherein the webs are composed of portions of two of the said sheets that are joined by metallic bonds, said portions being parts of the respective sheet that have been folded back so that the said two parts lie side-by-side.

14. A domed metallic structure made of two or more sheets of superplastic metal, the structure comprising:
 a convex surface having a peak,
 a concave surface that is opposed to the said convex surface, and bounds an open-ended cavity,
 webs extending between the convex and the concave surfaces thereby forming a cellular core within the domed structure, which webs are composed of portions of two of the said sheets that are joined by metallic bonds, said portions being parts of the respective sheet that have been folded back so that the said two parts lie side-by-side, and
 wherein the height of the cavity bounded by the concave surface is at least one third the width of the said cavity.

15. A structure as claimed in claim 14, wherein the said height is at least one half the said width.

* * * * *

UNITED STATES PATENT AND TRADEMARK OFFICE
CERTIFICATE OF CORRECTION

PATENT NO. : 5,143,276

DATED : September 1, 1992

INVENTOR(S) : Martin H. MANSBRIDGE; David STEPHEN; John NORTON

It is certified that error appears in the above-identified patent and that said Letters Patent is hereby corrected as shown below:

Column 10, line 45, after word "provided" insert -- which are --.

Signed and Sealed this

Fourteenth Day of September, 1993

Attest:

BRUCE LEHMAN

Attesting Officer

Commissioner of Patents and Trademarks